G. P. GREGORY.
GAGE.
APPLICATION FILED MAR. 23, 1918.
1,307,546.
Patented June 24, 1919.
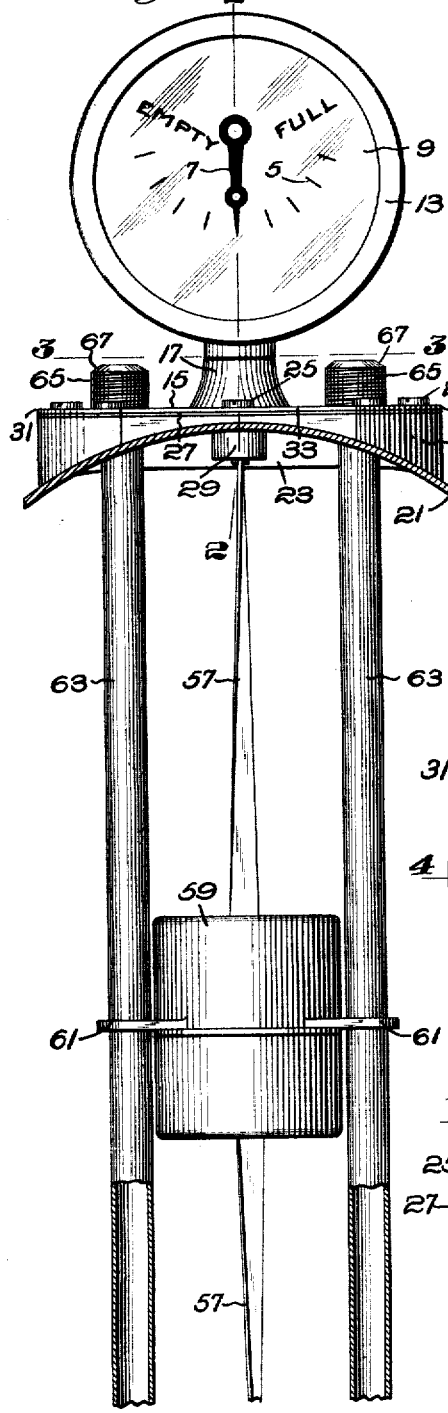
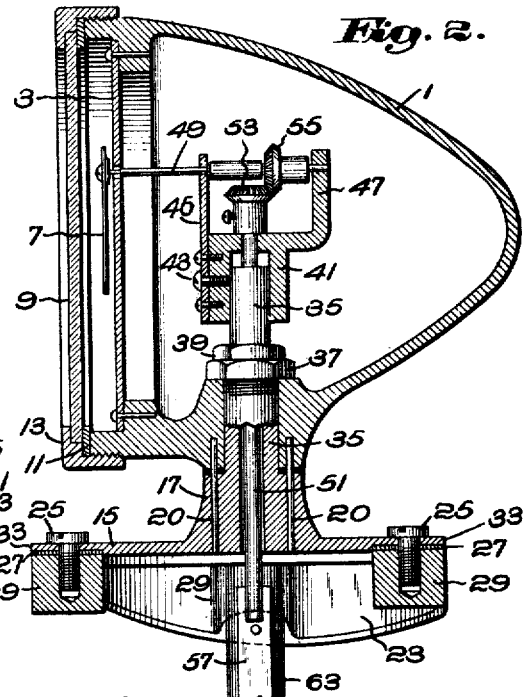
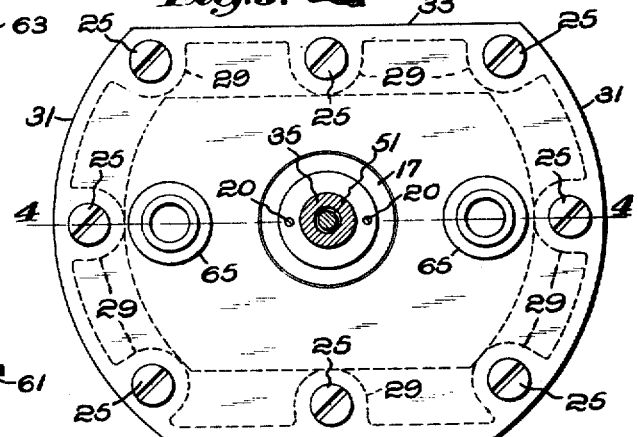
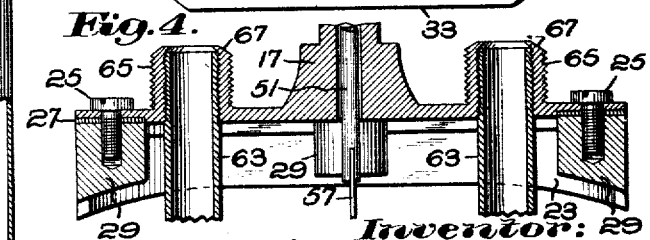
Inventor: George P. Gregory,
by Rob't P. Hahn,
Attorney.

UNITED STATES PATENT OFFICE.

GEORGE P. GREGORY, OF BOSTON, MASSACHUSETTS.

GAGE.

1,307,546.   Specification of Letters Patent.   Patented June 24, 1919.

Application filed March 23, 1918. Serial No. 224,212.

*To all whom it may concern:*

Be it known that I, GEORGE P. GREGORY, a citizen of the United States, residing at Boston, county of Suffolk, and State of Massachusetts, have invented an Improvement in Gages, of which the following description, in connection with the accompanying drawings, is a specification, like characters on the drawings representing like parts.

The invention hereinafter described relates to gages for indicating the level of liquids, and is designed more particularly, though not exclusively, for gasolene tanks of engines for driving aeroplanes.

The gasolene gage for an aeroplane is usually located in front of the driver where its reading can be readily visualized. In this position the gage is so exposed that strong air pressure will be brought to bear on the casing containing the dial and index. One object of the present invention is to provide simple and effective means for securing the said casing to the gasolene tank with the strength required.

It is customary to force the gasolene from the tank to the engine by fluid pressure produced in the tank, in order that the engine may be always supplied with gasolene in any position which the aeroplane may assume. Another object of the invention is to provide the gage with a pair of tubes, one of which may receive fluid pressure from a suitable source to force the fuel from the tank through the other tube. These tubes also desirably serve to guide the float for the gage in its rising and falling movements. The utilization of these tubes to perform the dual functions described eliminates the necessity of providing separate fittings or connections on the tank to enable the introduction of fluid pressure therein and the delivery of the gasolene therefrom. It also results in a desirable economy of material and weight, and labor in the construction and the assembly of the parts thereof.

Another object of the invention is to provide a collar which may be interposed between the base of the gage and the tank and be permanently secured to the latter. The collar is shaped to conform to the form and requirements of the tank and to allow the float and tubes to pass readily therethrough on insertion of the same into the tank and removal therefrom.

With the aforesaid and other objects in view, the character of the invention may be best understood by reference to the following description of one good form thereof shown in the accompanying drawing, wherein:—

Figure 1 is a front elevation of the gage shown herein as one embodiment of the invention;

Fig. 2 on an enlarged scale is a vertical section taken on line 2—2 of Fig. 1;

Fig. 3 on an enlarged scale is a horizontal section taken on line 3—3 of Fig. 1; and Fig. 4 is a vertical section taken on line 4—4 of Fig. 3.

Referring to the drawing, the gage shown therein as an exemplification of the invention, comprises a casing 1 of aluminum or other suitable material preferably made in an integral casting formed to present a front face and a body tapered rearward therefrom with cone-like appearance to reduce head resistance of the air thereon to a minimum. A plate 3 is fitted into a counterbore at the front of the casing and secured in position by suitable screws. This plate may have a dial 5 marked with graduations and adapted to coöperate with an index 7 for indicating the level of the liquid. The index may be mounted between the dial plate 3 and a strong glass 9 seated on a gasket 11 and secured to the front end of the casing by a bezel 13 threaded to said casing.

The head of the casing may be mounted on a base or flange 15. In the present instance, the head is connected to said base or flange by a neck 17, one part of which rises from and is integral with the base or flange 15, and the other part of which projects downward from the body of the casing, a suitable washer being interposed between said parts. Dowels 20 may project upward from the lower part of the neck into the body of the casing to position the head in its proper rotative adjustment with respect to the base or flange.

The top of the tank may be given a rounded or arched form as indicated at 21 to provide a strong construction with adequate stiffness to furnish a firm support to the gage. To connect the base with the top of the tank, a collar 23 may be provided having its upper face flat to receive the base or flange 15 of the head, and its bottom curved or formed to conform to the contour of the upper surface of the tank. The base may be detachably secured to said collar by suitable screws 25, a gasket 27 being interposed between said base and collar to prevent leakage between them. Preferably the screws 25 are tapped into bosses or lugs 29 formed on said collar, the lower ends of the holes for the screws being closed to prevent leakage of gasolene from said tank past said screws.

The collar and base or flange, in the present instance, are desirably given the form of a segment of a circle, with opposed ends 31 of circular arc form and opposed straight sides 33, one of the latter being preferably nearer than the other to the center of the circle from which the arcs of the ends 31 are struck. Thus, the construction of the collar and base is such that they are desirably light, adapted to the portion of the tank where the gage is located, and furnish means for securely connecting the head of the gage to the tank.

A post 35, in the present instance, integral with the base or flange, rises through a hole in the bottom of the head and projects up into said head toward the top thereof. The head may be secured to said post and the parts of the neck may be pressed together by a nut 37 threaded on said post and secured by a lock nut 39. A bracket 41 has a socket therein adapted to receive the upper end of the post 35, said bracket being secured thereto by a screw 43. The upper end of the bracket is provided with members 45 and 47 supporting a shaft 49 for rotating the index. A vertical shaft 51 projects upward through the base or flange and through the post toward the index shaft 49, said shafts being connected by intermeshing bevel gears 53 and 55 thereon. The lower end of the vertical shaft 51 may be connected to the upper end of a twisted ribbon 57 projecting toward the bottom of the tank. A float 59 is adapted to slide along this ribbon, and as it does so imparts rotation to said shafts and index, and causes the latter to indicate the level of the gasolene in the tank. To guide the float in its rising and falling movements and prevent rotation of the float, the latter may be provided with apertured ears 61 adapted to slide along tubes 63 projecting upward from the bottom of the tank through the collar and base or flange. The upper ends of said tubes are threaded in sleeves 65 preferably formed integral with the base or flange. The upper ends of said sleeves may be upset or formed to present internal limiting flanges 67 for engagement with the upper ends of the tubes 63. The outer surfaces of the sleeves 65 may be threaded to receive fittings for a pair of pipes (not shown), one of which may lead from a pump or other source of compressed air, and the other may lead to the engine. The construction is such that the fluid pressure introduced through one of the tubes, forces the gasolene from the tank through the other tube to the engine.

Gages for aeroplane use should have a construction such that the parts thereof may be quickly separated to allow inspection, adjustment or repair thereof. The gage described herein is well suited for this use, since the gage may be quickly and easily removed from the tank by release of the screws 25, which will permit the casing, base, tubes and float to be removed as a unit from the tank. The collar is given a segmental form with an opening sufficiently large to allow the tubes and float to readily pass therethrough, but without excess material which would objectionably add to the weight of the parts.

It is important that the gage should always be mounted on the collar with the dial plate facing the driver of the aeroplane. As stated, one of the straight sides 33 of the collar and the base or flange is nearer than the other to the center of the circle from which the arc shaped sides thereof are struck. As a consequence, one of the straight sides is longer than the other, and the holes for the screws 25 in the base or flange and the collar will only register when the base or flange is positioned on the collar with the longer straight side of the base or flange registering with the longer straight side of the collar. As a consequence, the construction enables the base or flange to be always mounted on the collar to bring the dial plate in proper position with respect to the driver of the aeroplane, without attention on the part of the mechanic who assembles the parts. There is a further advantage in the shape of the base or flange and collar, since the registration of the flat sides thereof determines the proper rotative adjustment of the base or flange with respect to the collar to assure correct registration of the screw holes thereof without attention on the part of the mechanic.

By the invention described, a gage is provided which is very light, but sufficiently strong in construction to withstand the rack and vibration which gages for aeroplanes necessarily experience.

It will be understood that the invention is not limited to the specific embodiment shown, but that various deviations may be made therefrom without departing from the spirit and scope of the appended claims.

What is claimed is:—

1. A gage for measuring the depth of liquids, comprising, in combination, a casing having a body with a neck projecting downward therefrom, a base for said neck, a collar secured to said base for connection with a tank, a pair of tubes extending through said collar and connected to said base, one of said tubes being adapted to receive fluid pressure to force the fuel from the tank through the other tube, a dial in said body, an index coöperating with said dial to indicate the level of the liquid, a float slidable on and guided by said tubes, a shaft rotated by said float and rising through said neck into the body of said casing, an index shaft in said body, and gearing connections for said shafts, said collar being of segmental form to conform to the tank and allow the float and tubes to pass therethrough.

2. A gage for measuring the depth of liquids, comprising, in combination, a casing having a body, a base for said body, a neck connecting said body with said base, a collar adapted to be secured to a tank, means detachably to connect said base with said collar, a pair of tubes connected to said base and projecting downward therefrom through said collar, one of said tubes being adapted to receive fluid pressure to force fuel from the tank through the other tube, a dial in the casing body, an index coöperating with said dial to indicate the level of the liquid in the tank, and means to move said index over said dial including a float slidable on and guided by said tubes.

3. A gage for measuring the depth of liquids, comprising, in combination, a casing, a base therefor, a neck connecting said casing with said base, a collar beneath said base for connection with a tank, a pair of tubes connected to said base and extending downward through said collar, a dial plate in said casing, an index coöperating with said dial plate, and means to move said index over said dial including a float slidable on and guided by said tubes, said collar being sufficiently large to allow the float and tubes to pass therethrough.

4. A gage for measuring the depth of liquids, comprising, in combination, a casing having a dial plate, an index coöperating with said dial plate, a collar of circular segmental form adapted to be secured to a tank, a base for said casing of circular segmental form corresponding to the form of said collar, means to secure said base to said collar, a float and means to impart movement from said float to said index including shafts having gearing connections mounted in said casing.

5. A gage for measuring the depth of liquids, comprising, in combination, a casing having a dial plate, an index coöperating with said dial plate, a float, means to impart movement to said index from said float including transmission means mounted in said casing, and means for securing said casing to a tank including a base or flange and a collar having opposed straight sides and opposed arc shaped sides, and means to secure said base or flange to said collar.

6. A gage for measuring the depth of liquids, comprising, in combination, a casing having a dial plate, an index coöperating with said dial plate, a collar of circular segmental form adapted for connection with a tank, a base for said casing having sleeves projecting therefrom, tubes secured to said sleeves, and extending downward from said base through said collar, and means to impart movement from said float to said index including a shaft projecting through said base into said casing, and gearing connections mounted in said casing.

7. A gage for measuring the depth of liquids, comprising, in combination, a casing having a dial plate, an index coöperating with said dial plate, a float, means to impart movement to said index from said float, and means for securing said casing to a tank including a base or flange for said casing, and a collar adapted to be secured to the tank, said collar being of circular segmental form with an opening therein sufficiently large to allow the float to pass therethrough.

8. A gage for measuring the depth of liquids, comprising, in combination, a casing having a dial plate, an index coöperating with said dial plate, means for securing said casing to a tank including a base or flange, a pair of tubes connected to said base or flange and projecting downward therefrom, one tube constituting an air inlet and the other a liquid outlet for the tank, a collar for connection with the tank surrounding said tubes, means to secure said base or flange to said collar, a float slidable along and guided by said tubes, and means to impart movement from said float to said index.

9. A gage for measuring the depth of liquids, comprising, in combination, a casing having a dial plate, an index coöperating with said dial plate, a base or flange for said casing, a collar secured to said base or flange adapted for connection with a tank, a pair of tubes connected to said base or flange, one for receiving fluid pressure to force fuel from the tank to the other, a float, and means to impart movement to said index from said float.

In testimony whereof, I have signed my name to this specification.

GEORGE P. GREGORY.